(12) United States Patent
Chang et al.

(10) Patent No.: US 7,382,423 B2
(45) Date of Patent: Jun. 3, 2008

(54) LIQUID CRYSTAL DISPLAY DEVICE AND BACKLIGHT MODULE THEREOF COMPRISING A SPACER FOR SUPPORTING THE OPTICAL FILM SET

(75) Inventors: Ke Chin Chang, Hsin-Chu (TW); Fu Tung Chen, Taoyuan County (TW); Yu Hsien Wang, Taoyuan County (TW)

(73) Assignee: Hannstar Display Corp., Taipei (TW)

( * ) Notice: Subject to any disclaimer, the term of this patent is extended or adjusted under 35 U.S.C. 154(b) by 387 days.

(21) Appl. No.: 10/957,670

(22) Filed: Oct. 5, 2004

(65) Prior Publication Data

US 2005/0219431 A1  Oct. 6, 2005

(30) Foreign Application Priority Data

Mar. 31, 2004  (TW) .............................. 93108883 A (51) Int. Cl.
*G02F 1/1333* (2006.01)
*G02F 1/1335* (2006.01)
*G01D 11/28* (2006.01)
*F21V 7/04* (2006.01)

(52) U.S. Cl. ............................ 349/64; 349/58; 349/70; 362/29; 362/632

(58) Field of Classification Search ................. 349/61, 349/58, 64; 362/632–634, 29
See application file for complete search history.

(56) References Cited

U.S. PATENT DOCUMENTS

| 6,407,781 | B2 | 6/2002 | Kitada |
| 6,417,833 | B1 | 7/2002 | Takemoto |
| 6,783,256 | B2 | 8/2004 | Moon |
| 6,815,485 | B2 | 11/2004 | Kamo |
| 6,867,825 | B2 | 3/2005 | Kanatsu et al. |
| 6,974,221 | B2* | 12/2005 | Wu et al. ..................... 362/29 |
| 6,979,102 | B2* | 12/2005 | You ........................... 362/218 |
| 6,997,582 | B2 | 2/2006 | Yang et al. |
| 7,059,736 | B2* | 6/2006 | Yu et al. ...................... 362/97 |
| 7,101,069 | B2 | 9/2006 | Yu et al. |
| 2002/0044437 | A1 | 4/2002 | Lee |
| 2002/0113924 | A1 | 8/2002 | Saito et al. |
| 2003/0123258 | A1 | 7/2003 | Nitto et al. |
| 2004/0012763 | A1 | 1/2004 | Chuan-Pei Yu et al. |

FOREIGN PATENT DOCUMENTS

| JP | 1138234 A | 5/1989 |
| JP | 10-326517 | 12/1998 |

OTHER PUBLICATIONS

JP 2002-116704A, Publication Date Apr. 19, 2002.

* cited by examiner

*Primary Examiner*—Andrew Schechter
*Assistant Examiner*—W. Patty Chen (57) ABSTRACT

A backlight module is applied to a liquid crystal display device. The liquid crystal display device includes an optical film set having at least one optical film. The optical film set is disposed above the backlight module. The backlight module includes a housing and a spacer. The housing has a bottom plate provided with a through opening, an inward side and an outward side, wherein the inward side faces the optical film and the outward side is opposite to the inward side. The spacer supports the optical film set and is mounted onto the bottom plate of the backlight module from the outward side of the bottom plate.

19 Claims, 8 Drawing Sheets

LIQUID CRYSTAL DISPLAY DEVICE AND BACKLIGHT MODULE THEREOF COMPRISING A SPACER FOR SUPPORTING THE OPTICAL FILM SET

This application claims the priority benefit of Taiwan Patent Application Serial Number 093108883, filed Mar. 31, 2004, the full disclosure of which is incorporated herein by reference.

BACKGROUND OF THE INVENTION

1. Field of the Invention

The present invention generally relates to a liquid crystal display device, and more particularly to a backlight module of a liquid crystal display device including a spacer which is mounted onto the bottom plate of the backlight module from the outward side of the bottom plate.

2. Description of the Related Art

Due to the advance of electronic technology, especially for the popularity of portable electronic products, the requirements of light, compact and low-energy consuming display are gradually increasing. With the advantages of low-energy consuming, low-heat dissipation, light weight and non-luminescence, liquid crystal displays (LCD) have been widely used in the electronic products and even have replaced the traditional CRT displays.

In general, a liquid crystal display usually includes a backlight module for providing light to its liquid crystal panel. However, the liquid crystal display may use different kinds of backlight modules depending on its use and size. There are two main types for these backlight modules, i.e. a direct back light type (or direct type) and an edge light type (or side light type).

Figure 1:
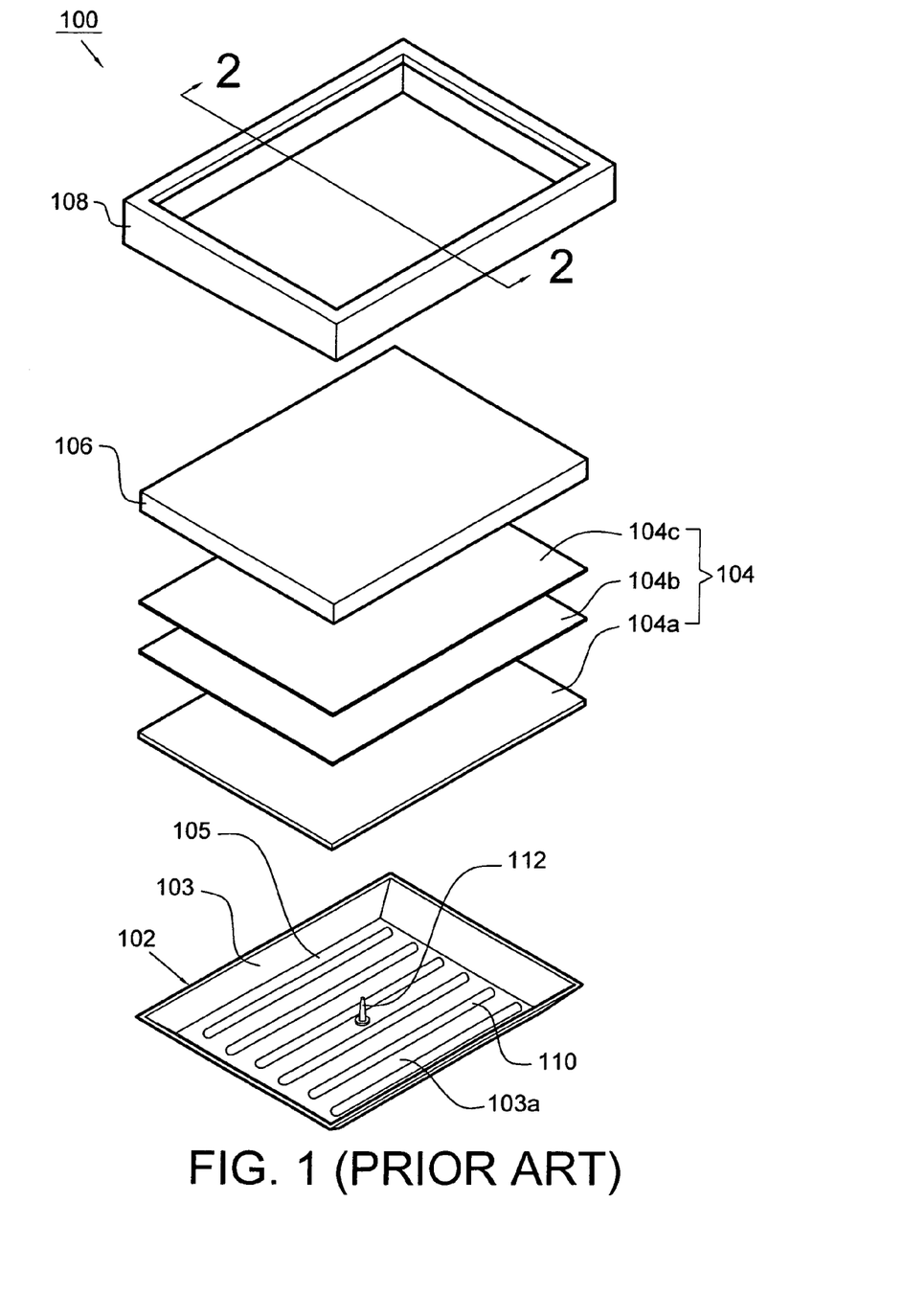
FIG. 1 is an exploded perspective schematic view of a liquid crystal display device in the prior art.

Referring to FIG. 1, it depicts a direct back light type backlight module of conventional liquid crystal display device 100. The liquid crystal display device 100 includes a backlight module 102, an optical film set 104, a liquid crystal panel 106 and a frame 108. The back light module 102 is disposed under the liquid crystal panel 106 for distributing the light from a light source uniformly over the surface of the liquid crystal panel 106. The back light module 102 includes a metal housing 103 and a plurality of lamps 110 disposed on an inward side of the metal housing 103. The optical film set 104 is disposed between the backlight module 102 and the liquid crystal panel 106 and includes a diffusing plate 104a located on the back light module 102, a diffusing sheet 104b located on the diffusing plate 104a and a prism sheet 104c located on the diffusing sheet 104b. The frame 108 is disposed on the liquid crystal panel 106 and the optical film set 104 and joined with the backlight module 102 for fixing the liquid crystal panel 106 and the optical film set 104 to the backlight module 102.

Figure 2:
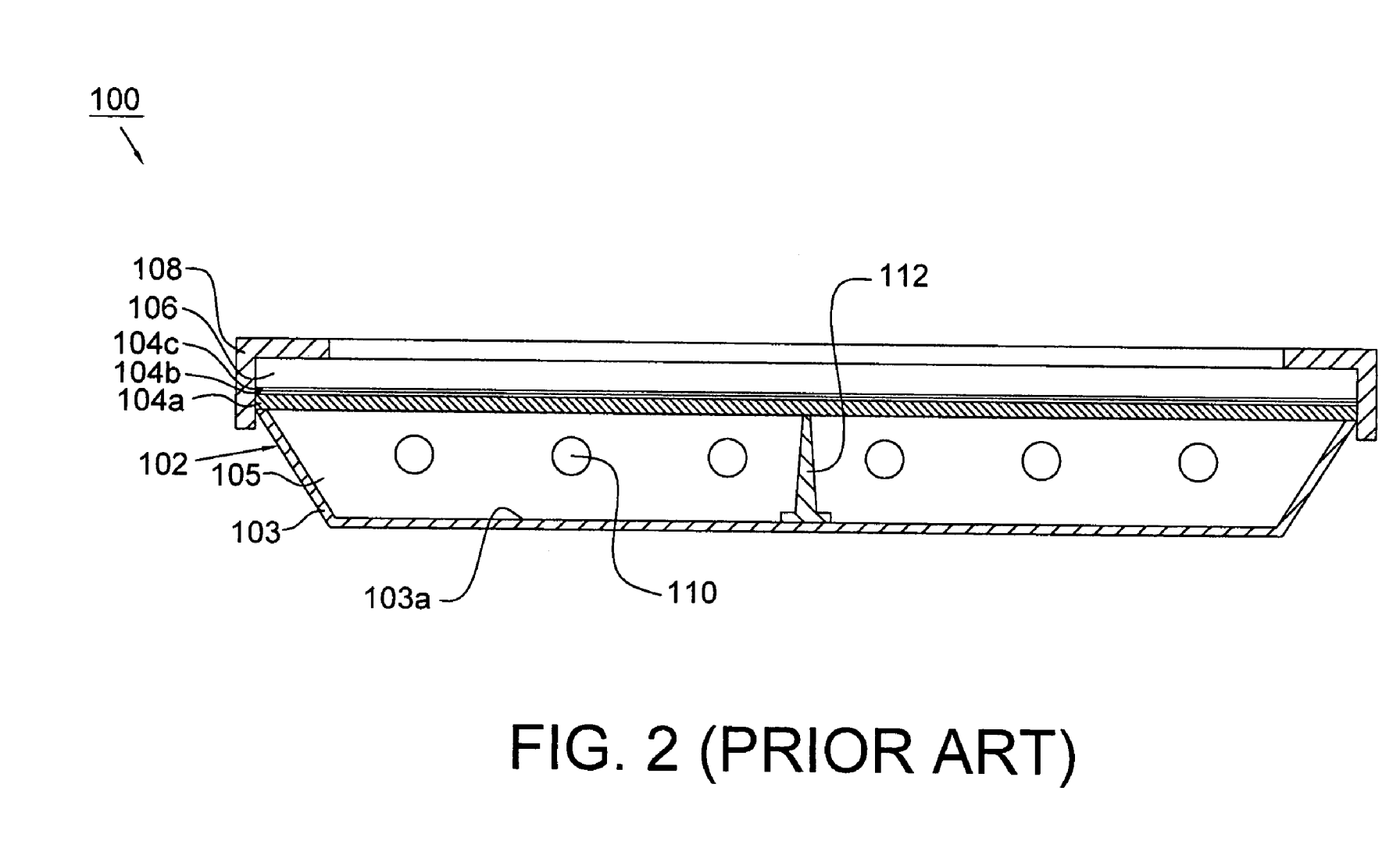
FIG. 2 is a cross-sectional schematic view along of 2-2 line of FIG. 1.

Referring to FIG. 2, the lamps 110 are separately disposed in a cavity 105 formed by the metal housing 103 and located under a display region of the liquid crystal panel 106 for uniformly distributing the generated light to the liquid crystal panel 106.

The liquid crystal display has a tendency to develop the large dimension, and therefore the requirement of the illumination is increasingly high as the dimension is increasingly large. Particularly, a direct back light type backlight module is applied to the liquid crystal display with large dimension, and therefore the direct back light type backlight module is increasingly important. However, the light emitting area of the direct back light type backlight module is increasingly large, but the thickness of the direct back light type backlight module is not changed. Thus, the structural strength of the direct back light type backlight module is not high enough such that it is easily deformed. In order to solve the problem of deformation, the direct back light type backlight module is provided with a plurality of spacers disposed therein for increasing the structural strength of the direct back light type backlight module.

Furthermore, referring to FIG. 2 again, there must be a predetermined distance between each lamp 110 and the diffusing plate 104a, and therefore the bottom plate 103a of the metal housing 103 is provided with at least one spacer 112 for supporting the diffusing plate 104a such that there can be the predetermined distance between each lamp 110 and the diffusing plate 104a. The metal housing 103 is coated with an adhesive layer (not shown), and the spacer 112 is mounted on the bottom plate 103a of the metal housing 103 by means of the adhesive layer.

Recently, when the optical film set is assembled to the direct back light type backlight module, the spacer 112 is firstly put in the metal housing 103 by a front putting manner (i.e. the front putting manner is that the spacer 112 is put in the metal housing 103 from the upward side of the bottom plate 103a) and is then mounted on the bottom plate 103a of the metal housing 103, and the diffusing plate 104a, the diffusing sheet 104b and the prism sheet 104c are finally disposed on the backlight module 102. However, the diffusing plate 104a and the optical films must be positioned by a fine-tuning action, and the fine-tuning action may cause the spacer 112 to scrape the surface of the diffusing plate 104a, thereby resulting in a scrape on the diffusing plate 104a and further resulting in bad display quality.

Accordingly, there exists a need for a backlight module including a spacer which is mounted onto the bottom plate of the backlight module from the outward side of the bottom plate.

SUMMARY OF THE INVENTION

It is an object of the present invention to provide a backlight module including a spacer which can be mounted onto the bottom plate of the backlight module from the outward side of the bottom plate so as to prevent a diffusing plate from scrape.

The present invention provides a backlight module, which is applied to a liquid crystal display device. The liquid crystal display device includes an optical film set having at least one optical film, wherein the optical film is disposed above the backlight module. The backlight module includes a housing and a spacer. The housing has a bottom plate provided with a through opening, an inward side and an outward side, wherein the inward side faces the optical film and the outward side is opposite to the inward side. The spacer supports the optical film set and is mounted onto the bottom plate of the backlight module from the outward side of the bottom plate.

According to the backlight module of the present invention, the fine-tuning action of the optical film set cannot cause the spacer to scrape the optical film set. If the housing must be taken apart when the lamp needs change, the spacer can be firstly removed from the outward side of the housing so as to prevent the diffusing plate from scrape. Furthermore, the spacer according to the present invention has advantages of easy assembly and resource recovery.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 3:
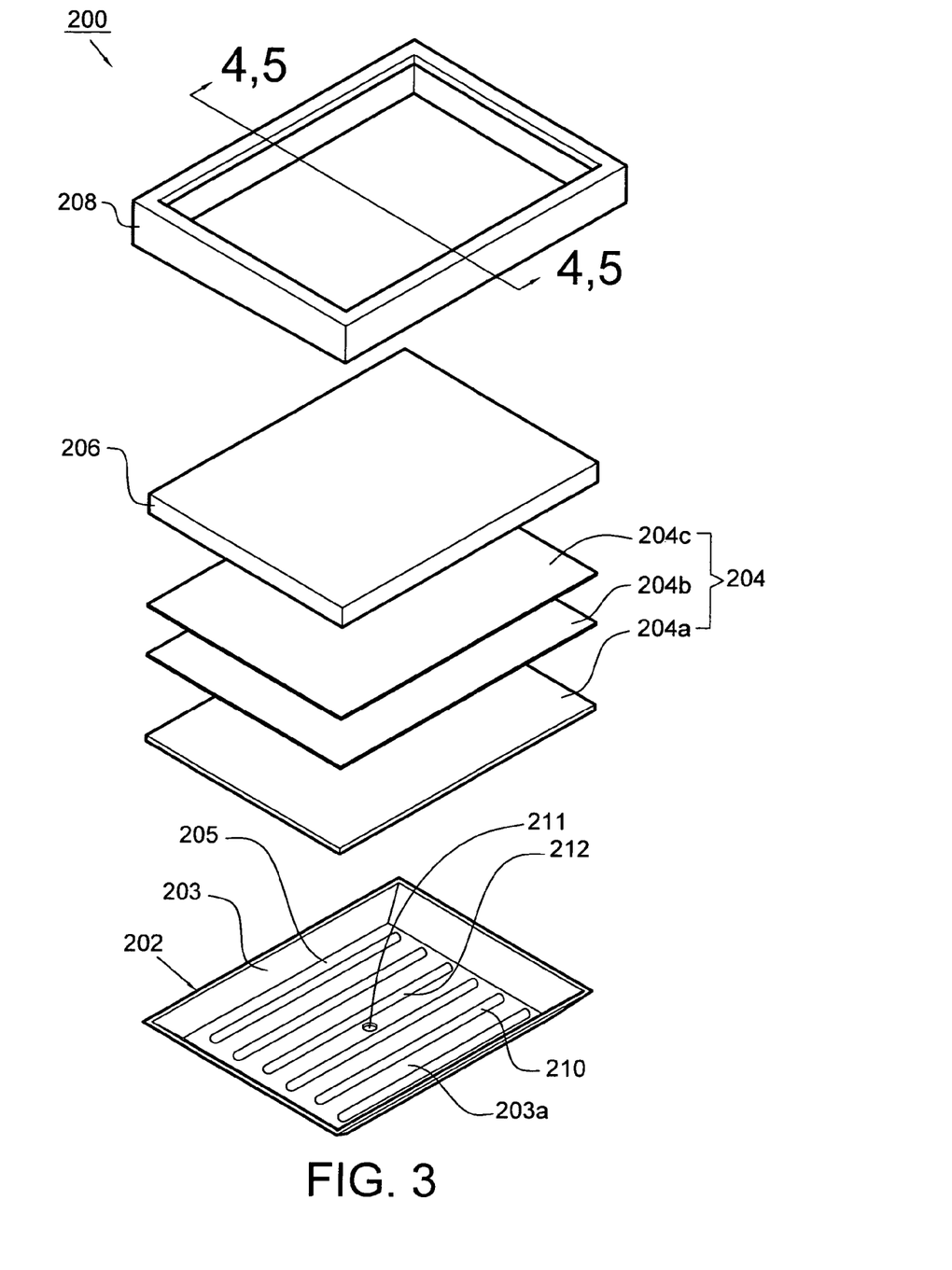
FIG. 3 is an exploded perspective schematic view of a liquid crystal display device according to the present invention.

Referring to FIG. 3, it depicts a liquid crystal display device 200 according to an embodiment of the present invention. The liquid crystal display device 200 includes a backlight module 202 (e.g. a direct back light type backlight module), an optical film set 204, a liquid crystal panel 206 and a frame 208. The back light module 202 is disposed under the liquid crystal panel 206 and the optical film set 204 for distributing the light from a light source uniformly over the surface of the liquid crystal panel 206. The back light module 202 includes a housing 203, such as a metal housing, and a plurality of lamps 210, such as cold cathode fluorescent lamps, disposed on a bottom plate 203a of the housing 203. The optical film set 204 is disposed between the backlight module 202 and the liquid crystal panel 206 and includes a diffusing plate 204a located on the back light module 202 and a plurality of optical films, such as a diffusing sheet 204b and a prism sheet 204c, located on the diffusing sheet 204b. The frame 208 is disposed on the liquid crystal panel 206 and the optical film set 204 and joined with the backlight module 202 for fixing the liquid crystal panel 206 and the optical film set 204 to the backlight module 202. The lamps 210 are separately disposed in a cavity 205 formed by the housing 203 and located under a display region of the liquid crystal panel 206 for uniformly distributing the generated light to the liquid crystal panel 206.

Figure 4:
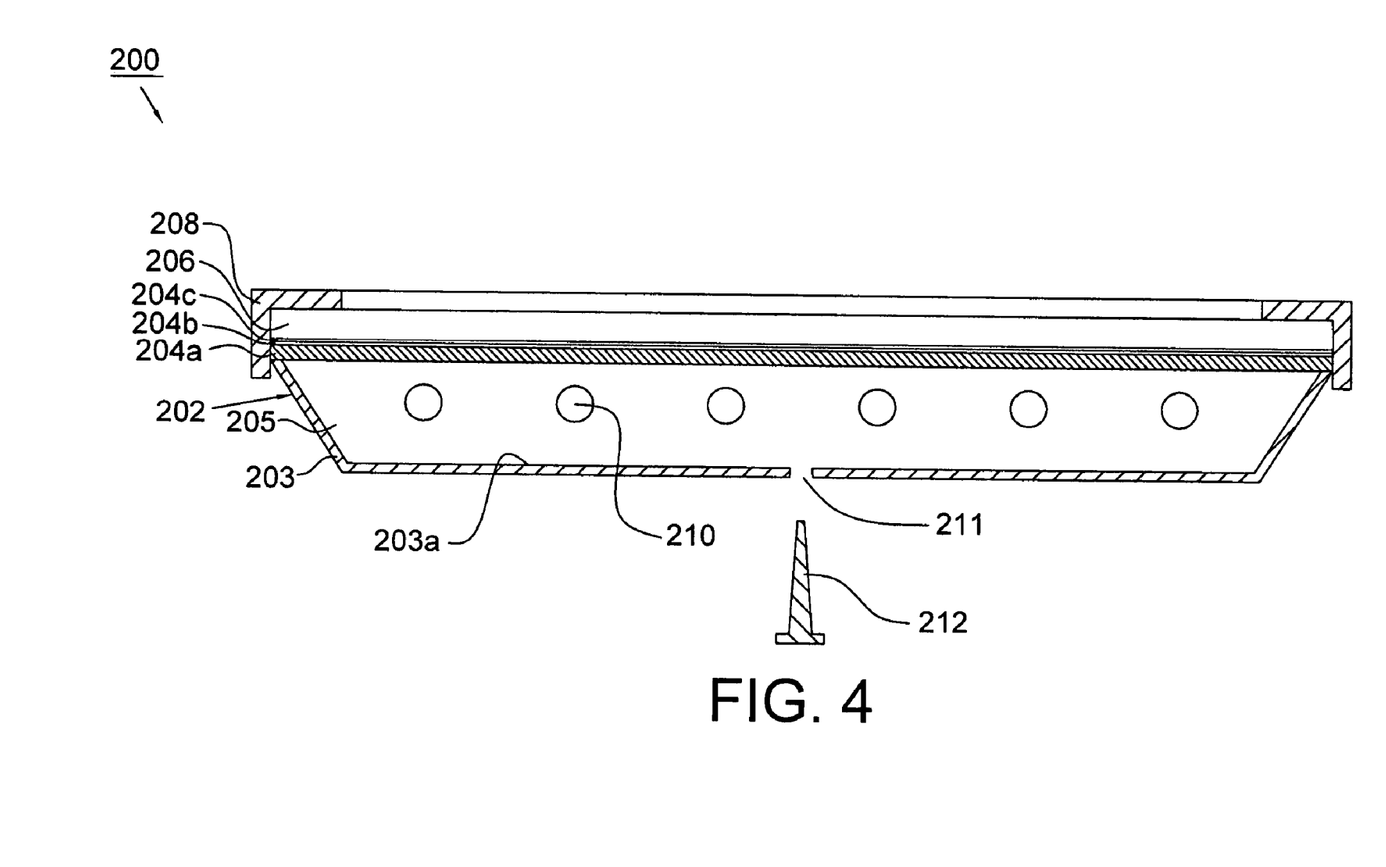
FIG. 4 is a cross-sectional schematic view along of 4-4 line of FIG. 3 showing a spacer not disposed thereto.
Figure 5:
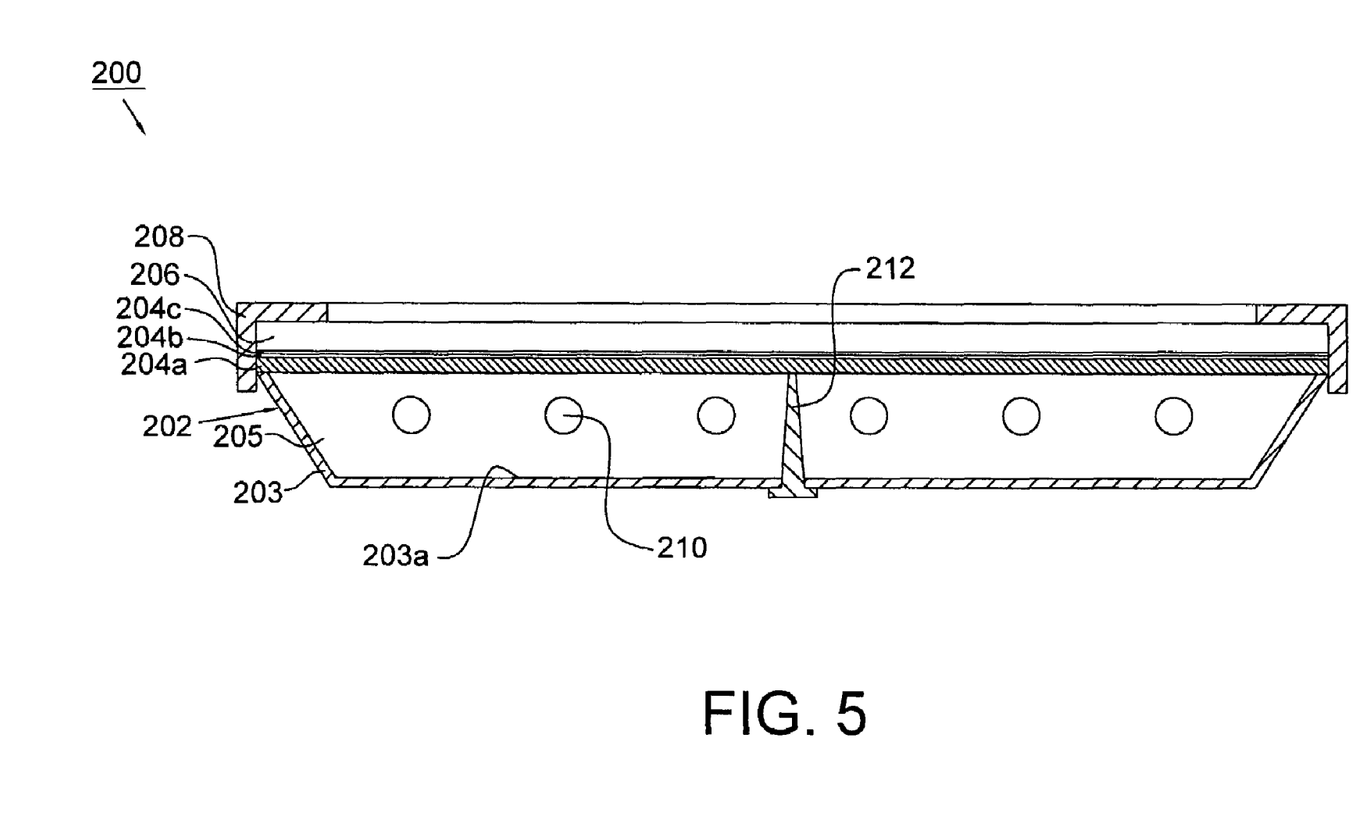
FIG. 5 is a cross-sectional schematic view along of 5-5 line of FIG. 3 showing a spacer disposed thereto.

Referring to FIG. 4, the bottom plate 203a has an inward side and an outward side opposite to the inward side, wherein the inward side faces the optical film set 204. When the optical film set 204 is assembled to the backlight module 202, the diffusing plate 204a and the optical films are firstly disposed on the backlight module 202, the diffusing plate 204a and the optical films are then positioned by a fine tuning action, and at least one spacer 212 is finally put in the housing 203 by a rear putting manner (i.e. the rear putting manner is that the spacer 212 is put in a through opening 211 of the bottom plate 203a from a downward side or a outward side of the bottom plate 203a) and is mounted on the bottom plate 203a of the housing 203 for supporting the optical film set 204, shown in FIG. 5. Thus, the fine-tuning action of the diffusing plate 204a and the optical films cannot cause the spacer 212 to scrape a lower surface of the optical film set 204. Furthermore, if the housing 203 must be taken apart when the lamp needs change, the spacer 312 can be firstly removed from the outward side of the housing 203 so as to prevent the optical film set 204 from scrape.

Referring to FIG. 5 again, there can be a constant distance between each lamp 210 and the optical film set 204 by using the spacer 212. Furthermore, the spacer 212 enhances the structure of the backlight module 202 so as to prevent the backlight module 202 from deformation.

Figure 6:
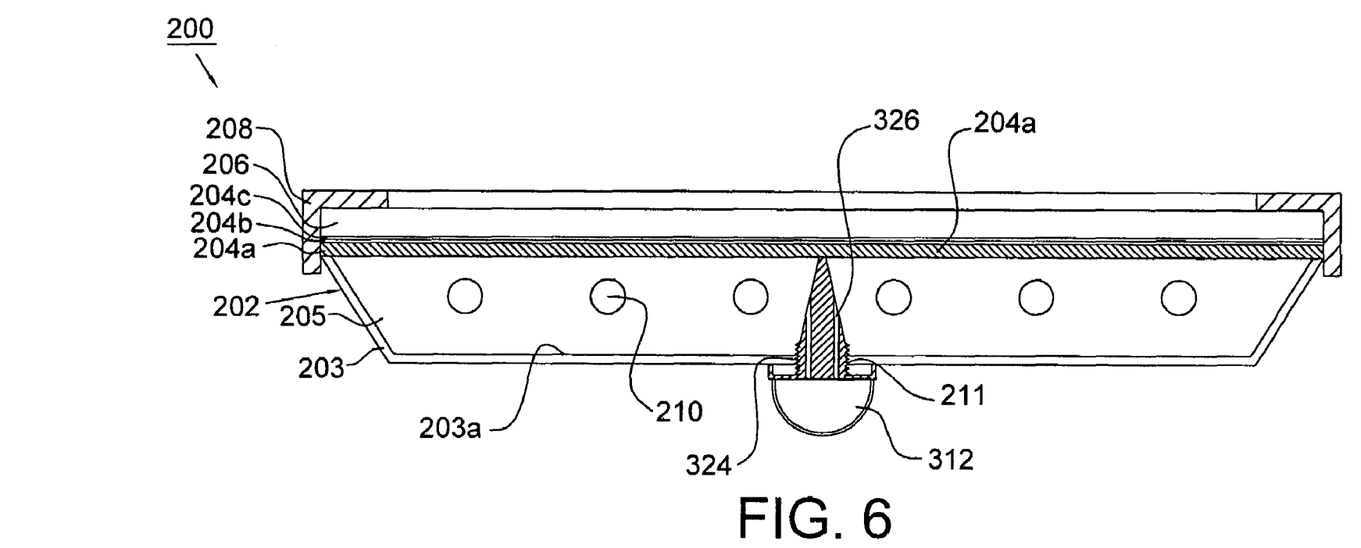
FIG. 6 is a cross-sectional schematic view of a liquid crystal display device according to the present invention showing a spacer according to the first embodiment.
Figure 7:
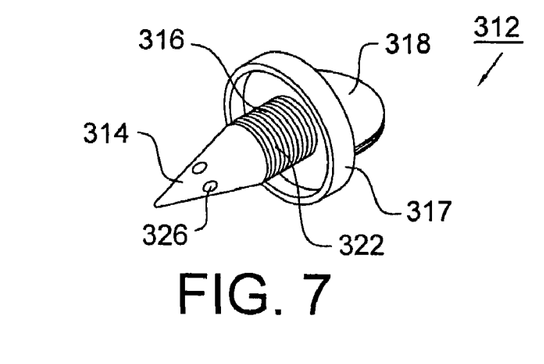
FIG. 7 is a perspective schematic view of a spacer according to the first embodiment of the present invention.

Referring to FIGS. 6 and 7, they depict a spacer 312 according to the first embodiment of the present invention. The spacer 312 is mounted in the bottom plate 203a by means of a screwed attachment manner. The spacer 312 includes a protruding portion 314, an intermediate portion 316, a stopper portion 317 and a rear portion 318. The protruding portion 314 will touch the optical film set 204 and can be of white or transparent taper shape, which is made of polycarbonate (PC) or Polymethyl Methacrylate (PMMA) material. The intermediate portion 316 can be cylindrical in shape, is connected to the protruding portion 314, and is provided with outer threads 322. The stopper portion 317 can be in the shape of cap, e.g. being flat in shape, in the shape of screw nut, being circular in shape or being rectangular in shape, is connected to the intermediate portion 316, and is located on the outer side of the bottom plate 203a. The rear portion 318 is connected to the stopper portion 317, and can be in the shape of plate so as to be conveniently rotated by a user.

The through opening 211 of the bottom plate 203a is provided with inner threads 324 which are corresponding to the outer threads 322 of the intermediate portion 316. When the spacer 312 is put in the through opening 211 from the outward side of the bottom plate 203a, the rear portion 318 of the spacer 312 can be rotated by the hand of the user. The outer threads 322 of the intermediate portion 316 are engaged with the inner threads 324 of the through opening 211, such that the protruding portion 314 of the spacer 312 can be rotated and entered into the cavity 205 of the backlight module 200. When the stopper portion 317 of the spacer 312 is stopped on the bottom plate, the spacer 312 is mounted on the bottom plate 203a of the housing 203. Likewise, when the spacer 312 must be taken away from the through opening 211 of the bottom plate 203a, the rear portion 318 of the spacer 312 can be rotated in opposite direction by the hand of the user, such that the spacer 312 can be taken away from the bottom plate 203a of the housing 203. The spacer 312 according to the present invention has advantages of easy assembly and resource recovery.

Furthermore, referring to FIGS. 6 and 7 again, the spacer 312 further includes a plurality of thermally conductive holes or grooves 326 which are connected to one another or are separated for dissipating the heat of the cavity 205 of the housing 203.

Figure 8:
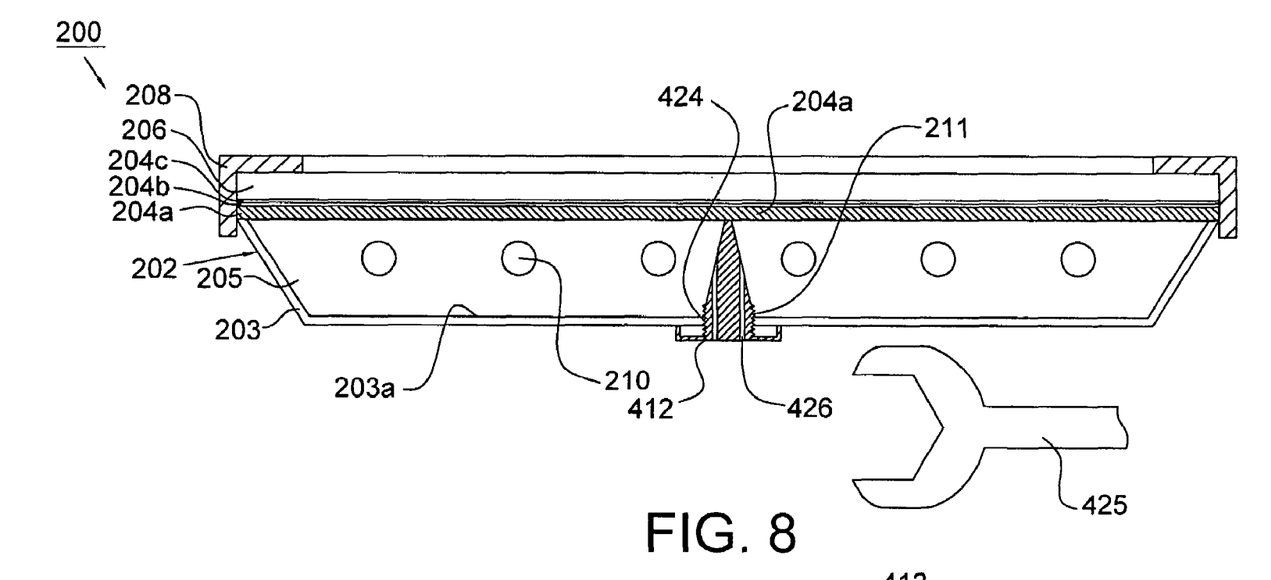
FIG. 8 is a cross-sectional schematic view of a liquid crystal display device according to the present invention showing a spacer according to the second embodiment.
Figure 9:
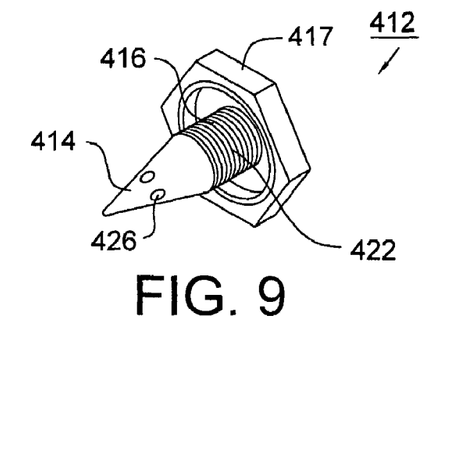
FIG. 9 is a perspective schematic view of a spacer according to the second embodiment of the present invention.

Referring to FIGS. 8 and 9, they depict a spacer 412 according to the second embodiment of the present invention, which is mounted on the bottom plate 203a by using a screwed attachment manner. The spacer 412 is similar to the spacer 312 wherein the similar elements are designated with the similar reference numerals. The spacer 412 includes a protruding portion 414, an intermediate portion 416 and a stopper portion 417. The protruding portion 414 will contact the optical film set 204. The intermediate portion 416 is connected to the protruding portion 414 and provided with outer threads 422. The stopper portion 417 is connected to the intermediate portion 416 and can be in the shape of screwed cap, e.g. being hexagon in shape, so as to be conveniently rotated by a user using a tool 425, e.g. hexagon wrench.

The through opening 211 of the bottom plate 203a is provided with inner threads 424 which are corresponding to the outer threads 422 of the intermediate portion 416. When the spacer 412 is put in the through opening 211 from the outward side of the bottom plate 203a, the stopper portion 417 of the spacer 412 can be rotated by the user using the tool 425. The outer threads 422 of the intermediate portion 416 are engaged with the inner threads 424 of the through opening 211, such that the protruding portion 414 of the spacer 412 can be rotated and entered into the cavity 205 of the backlight module 200. When the stopper portion 417 of the spacer 412 is stopped on the bottom plate 203a, the spacer 412 is mounted on the bottom plate 203a of the housing 203. Likewise, when the spacer 412 must be taken away from the through opening 211 of the bottom plate 203a, the stopper portion 417 of the spacer 412 can be rotated in opposite direction by the user using the tool 425, such that the spacer 412 can be taken away from the bottom plate 203a of the housing 203. The spacer 412 according to the present invention has advantages of easy assembly and resource recovery.

Furthermore, referring to FIGS. 8 and 9 again, the spacer 412 further includes a plurality of thermally conductive holes or grooves 326 for dissipating the heat of the cavity 205 of the housing 203.

Figure 10:
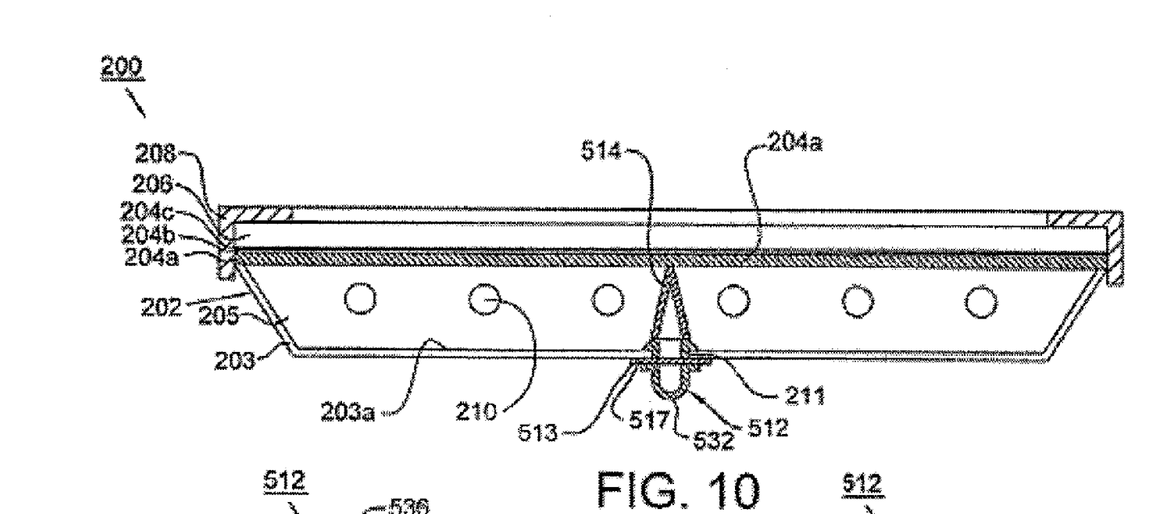
FIG. 10 is a cross-sectional schematic view of a liquid crystal display device according to the present invention showing a spacer according to the third embodiment.
Figure 11A:
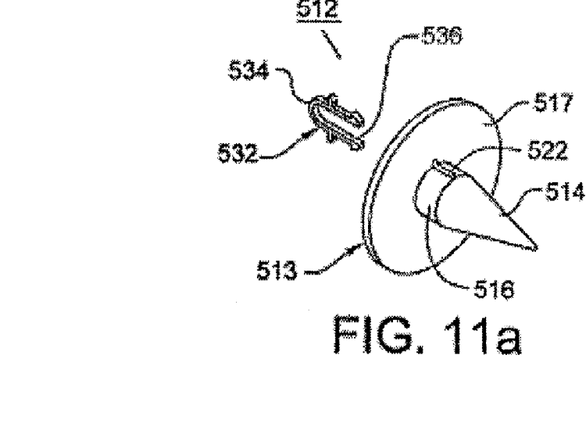
FIG. 11a is a perspective schematic view of a spacer according to the third embodiment of the present invention showing the spacer is disassembled.
Figure 11B:
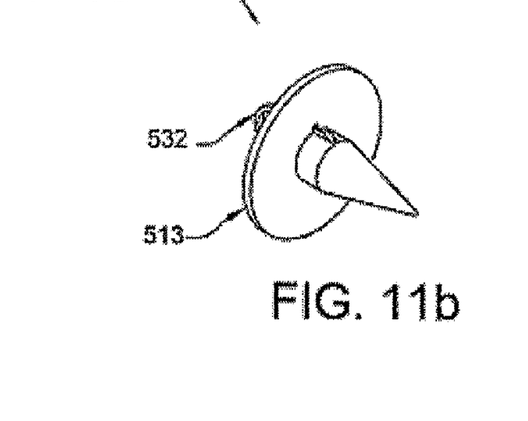
FIG. 11b is a perspective schematic view of a spacer according to the third embodiment of the present invention showing the spacer is assembled.

Referring to FIGS. 10, 11a and 11b, they depict a spacer 512 according to the third embodiment of the present invention, which is mounted on the bottom plate 203a by using a structurally snapping manner. The spacer 512 includes a spacer body 513 and an inverse hook 532. The spacer body 513 includes a protruding portion 514, an intermediate portion 516 and a stopper portion 517. The protruding portion 514 will contact the optical film set 204. The intermediate portion 516 can be cylindrical in shape or rectangular in shape, is connected to the protruding portion 514, and has a groove 522 located in the edge of the intermediate portion 516. The stopper portion 517 is connected to the intermediate portion 516 and located on the outside of the bottom plate 203a. The inverse hook 532 has a rear end 534 and a protruding end 536, and the protruding end 536 can be snapped into the groove 522 of the intermediate portion 516. The inverse hook 532 can be made of elastic material.

The through opening 211 of the bottom plate 203a can be circular or rectangular opening for be corresponding the intermediate portion 516 of the spacer body 513. When the spacer 512 is put in the through opening 211 from the outward side of the bottom plate 203a, the spacer body 513 is inserted into the through opening 211 and then the protruding end 536 of the inverse hook 532 is inserted and snapped into the groove 522 of the intermediate portion 516 by the user. The protruding end 536 of the inverse hook 532 hooks the bottom plate 203a, such that the protruding portion 514 of the spacer 512 is mounted to the cavity 205 of the backlight module 200. When the stopper portion 517 of the spacer 512 is stopped on the bottom plate 203a, the spacer 512 is mounted on the bottom plate 203a of the housing 203. Likewise, when the spacer 512 must be taken away from the through opening 211 of the bottom plate 203a, the inverse hook 532 is firstly removed and then the spacer body 513 is removed, such that the spacer 512 can be taken away from the bottom plate 203a of the housing 203. The spacer 512 according to the present invention has advantages of easy assembly and resource recovery.

Furthermore, referring to FIGS. 11a and 11b again, the spacer 512 can be of hollow shape and is connected to the groove 522 of the intermediate portion 516. The gap between the protruding end 536 and the groove 522 is provided for dissipating the heat of the cavity 205 of the housing 203.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A backlight module for a liquid crystal display device, comprising:
    an optical film set;
    a housing having a bottom plate defining a through opening therein, an inward side and an outward side, wherein the inward side faces the optical film set and the outward side is opposite to the inward side; and
    a spacer for supporting the optical film set, the spacer being put into the through opening of the bottom plate of the backlight module from the outward side of the bottom plate, the spacer comprising a thermally conductive groove, and the spacer having:
    a tapered protruding portion,
    an intermediate portion connected to the protruding portion, and
    a stopper portion connected to the intermediate portion, wherein:
        the protruding portion is configured to contact the optical film set,
        the diameter of the intermediate portion is not larger than the diameter of the through opening,
        the intermediate portion is disposed in the through opening,
        the stopper portion is in the shape of plate, and
        all of the stopper portion is positioned outside the outward side of the bottom plate.

2. The backlight module as claimed in claim 1, wherein the spacer is hollow in shape.

3. The backlight module as claimed in claim 1, wherein the spacer is mounted on the bottom plate by structurally snapping manner.

4. The backlight module as claimed in claim 1, wherein the spacer further comprises an inverse hook for mounting the protruding portion in the backlight module.

5. The backlight module as claimed in claim 4, wherein the intermediate portion has a groove, and the inverse hook has a protruding end snapped into the groove of the intermediate portion.

6. The backlight module as claimed in claim 5, wherein there is a gap between the protruding end and the groove of the intermediate portion.

7. A liquid crystal display device comprising:
    a liquid crystal panel;
    a backlight module disposed under the liquid crystal panel and comprising:

an optical film set;

a housing having a bottom plate defining a through opening therein, an inward side and an outward side, wherein the inward side faces the optical film set and the outward side is opposite to the inward side; and a spacer for supporting the optical film set, the spacer being put into the through opening of the bottom plate of the backlight module from the outward side of the bottom plate, the spacer being hollow and having a tapered protruding portion, an intermediate portion connected to the tapered protruding portion, and a stopper portion connected to the intermediate portion, wherein the protruding portion is:

configured to contact the optical film set, the diameter of the intermediate portion is not larger than the diameter of the through opening, the intermediate portion is disposed in the through opening, the stopper portion is in the shape of plate, and all of the stopper portion is positioned outside the outward side of the bottom plate; and a frame joined with the backlight module for fixing the liquid crystal panel.

8. The liquid crystal display device as claimed in claim 7, wherein the spacer further comprises a rear portion connected to the stopper portion.

9. The liquid crystal display device as claimed in claim 7, wherein the spacer is mounted on the bottom plate by a structurally snapping manner.

10. The liquid crystal display device as claimed in claim 9, wherein the spacer further comprises an inverse hook for mounting the protruding portion in the backlight module.

11. The liquid crystal display device as claimed in claim 10, wherein the intermediate portion has a groove, and the inverse hook has a protruding end snapped into the groove of the intermediate portion.

12. The liquid crystal display device as claimed in claim 7, wherein the spacer further comprises a thermally conductive groove.

13. The liquid crystal display device as claimed in claim 7, wherein the spacer further comprises a thermally conductive groove.

14. A backlight module for a liquid crystal display device, comprising:

an optical film set;

a housing having a bottom plate defining a through opening therein, an inward side and an outward side, wherein the inward side faces the optical film set and the outward side is opposite to the inward side; and a spacer for supporting the optical film set, the spacer being put into the through opening of the bottom plate of the backlight module from the outward side of the bottom plate, the spacer being hollow, and the spacer having:

a tapered protruding portion, an intermediate portion connected to the protruding portion, and a stopper portion connected to the intermediate portion, wherein:

the protruding portion is configured to contact the optical film set, the intermediate portion is disposed in the through opening, and all of the stopper portion is positioned outside the outward side of the bottom plate.

15. The backlight module as claimed in claim 14, wherein the spacer is mounted on the bottom plate by structurally snapping manner.

16. The backlight module as claimed in claim 14, wherein the spacer further comprises an inverse hook for mounting the protruding portion in the backlight module.

17. The backlight module as claimed in claim 16, wherein the intermediate portion has a groove, and the inverse hook has a protruding end snapped into the groove of the intermediate portion.

18. The backlight module as claimed in claim 16, wherein there is a gap between the protruding end and the groove of the intermediate portion.

19. The backlight module as claimed in claim 14, wherein the spacer further comprises a thermally conductive groove.

* * * * *